(12) United States Patent
Lim

(10) Patent No.: US 10,811,743 B2
(45) Date of Patent: Oct. 20, 2020

(54) BATTERY SYSTEM OF VEHICLE

(71) Applicants: Hyundai Motor Company, Seoul (KR); Kia Motors Corporation, Seoul (KR)

(72) Inventor: Hae Kyu Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 142 days.

(21) Appl. No.: 16/155,025

(22) Filed: Oct. 9, 2018

(65) Prior Publication Data

US 2020/0006824 A1 Jan. 2, 2020

(30) Foreign Application Priority Data

Jun. 28, 2018 (KR) .................. 10-2018-0074721

(51) Int. Cl.
*H01M 10/6556* (2014.01)
*H01M 10/625* (2014.01)
*H01M 10/613* (2014.01)

(52) U.S. Cl.
CPC ..... *H01M 10/6556* (2015.04); *H01M 10/613* (2015.04); *H01M 10/625* (2015.04); *H01M 2220/20* (2013.01)

(58) Field of Classification Search
None
See application file for complete search history.

(56) References Cited

U.S. PATENT DOCUMENTS

2013/0143093 A1* 6/2013 Teng .................. F28F 3/12
  429/120
2014/0342195 A1* 11/2014 Bhola ............... H01M 10/6556
  429/50

FOREIGN PATENT DOCUMENTS

KR    10-2016-0105360 A    9/2016

\* cited by examiner

*Primary Examiner* — Yoshitoshi Takeuchi
(74) *Attorney, Agent, or Firm* — Mintz Levin Cohn Ferris Glovsky and Popeo, P.C.; Peter F. Corless

(57) ABSTRACT

A battery system is provided. The system includes a channel plate of which one side surface is contacted with a battery module and includes a cooling channel therein in which refrigerant circulates to cool the battery module. A first end plate supplies the refrigerant transmitted from the outside through an inflow port to the channel plate and transmits the refrigerant passing through the channel plate to the outside through an outflow port and is coupled to the channel plate to form a space surrounding the battery module. A second end plate is coupled to the channel plate opposite the first end plate to form the space surrounding the battery module. A cover plate is coupled to the first end plate and the second end plate opposite the channel plate to form the space surrounding the battery module.

10 Claims, 6 Drawing Sheets

BATTERY SYSTEM OF VEHICLE

CROSS REFERENCE TO RELATED APPLICATION

The present application claims priority of Korean Patent Application No. 10-2018-0074721 filed on Jun. 28, 2018, the entire contents of which is incorporated herein for all purposes by this reference.

BACKGROUND

Field of the Disclosure

The present disclosure relates to a battery system of a vehicle, and more particularly, to a cooling technology of a battery system used in a hybrid vehicle or an electric vehicle.

Description of the Related Art

In hybrid vehicles and electric vehicles, a battery system is required to store the electrical energy required to drive the vehicle. Such a battery system typically includes a plurality of battery modules, and the battery module includes a plurality of battery cells. The battery system further includes a cooling apparatus for cooling the heat generated in the battery module to secure the operational stability. Recently, a water cooling system using a refrigerant has been considered for obtaining effective and stable cooling performance. In the cooling apparatus of the water cooling type as described above, various piping and connection devices for circulation of the coolant are required, and the volume and weight of these components need to be reduced as much as possible.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a battery system of a vehicle capable of more smoothly and stably cooling the heat generated by the battery module while using as a simplified configuration and a fewer number of parts, ensuring the structural rigidity required outside the battery module, minimizing the leakage of refrigerant by simplification of the cooling circuit and increasing the energy density by unnecessary space minimization.

A battery system of a vehicle according to the present disclosure may include a channel plate of which one side surface is contacted with a battery module and including a cooling channel therein in which refrigerant circulates to cool the battery module, a first end plate configured to supply the refrigerant transmitted from the outside through an inflow port to the channel plate and transmit the refrigerant passing through the channel plate to the outside through an outflow port and coupled to the channel plate to form a space surrounding the battery module, a second end plate coupled to the channel plate opposite the first end plate to form the space surrounding the battery module, and a cover plate coupled to the first end plate and the second end plate opposite the channel plate to form the space surrounding the battery module.

The channel plate may be formed of a hexahedron flat plate shape, one end portion of the channel plate may be formed with a supply port and an outlet coupled to the first end plate to receive and provide the refrigerant, and the inside of the channel plate may be formed with a plurality of cooling channel that extend from the supply port to the outlet, which are formed evenly distributed over the surface contacting with the battery module. The inflow port and outflow port may be integrally formed at the first end plate to protrude towards the outside, and a flow path connected from the inflow port to the supply port and a flow path connected from the outlet to the outflow port may be formed inside the first end plate.

At least one battery module surrounded by the channel plate, the first end plate, the second end plate and the cover plate may configure a module assembly. A case provided in the vehicle body for accommodating the module assembly may include an aperture through which the inflow port and the outflow port are passed, respectively, a gasket for surrounding and sealing each of the inflow port and the outflow port may be disposed between the aperture and the first end plate, and a tie bolt may be fastened to the first end plate from the outside of the case to apply the pressure necessary for sealing the gasket by pulling the module assembly toward the case.

The second end plate may be formed as a double plate structure in which a space is formed and the first end plate and the second end plate are coupled to the channel plate and the cover plate to provide structural rigidity to wrap and support the internal battery module. The cover plate may be provided with a cooling channel in which the refrigerant circulates in the same way as the channel plate.

The present disclosure may more smoothly and stably cool the heat generated by the battery module while using as a simplified configuration and a decreased number of parts, ensure the structural rigidity required outside the battery module, minimize the leakage of refrigerant by simplification of the cooling circuit and increase the energy density by unnecessary space minimization.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
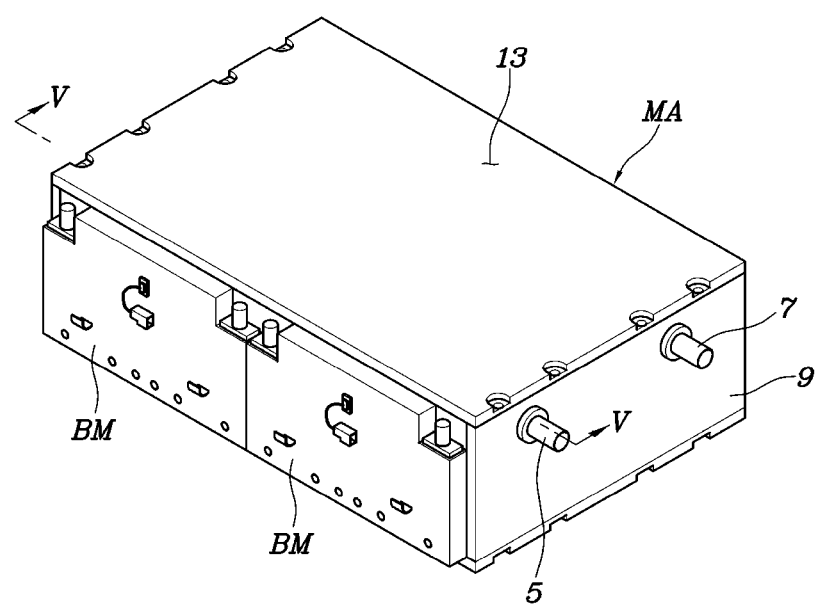
FIG. 1 is a drawing illustrating a battery system of a vehicle according an exemplary embodiment of to the present disclosure.
Figure 2:
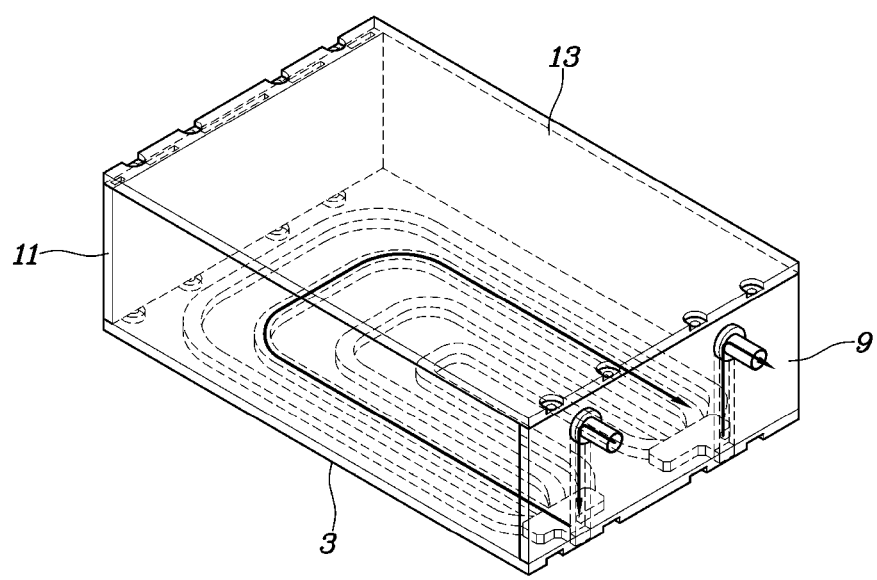
FIG. 2 is a drawing describing the flow path of the refrigerant in the structure of FIG. 1 according an exemplary embodiment of to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring to FIG. 1 to FIG. 6, a battery system of a vehicle according to an exemplary embodiment of the present disclosure may include a channel plate 3 of which one side surface is contacted with a battery module BM and includes a cooling channel 1 therein in which refrigerant circulates to cool the battery module BM; a first end plate 9 configured to supply the refrigerant transmitted from the outside through an inflow port 5 to the channel plate 3 and transmit the refrigerant passing through the channel plate 3 to the outside through an outflow port 7 and coupled to the channel plate 3 to form a space surrounding the battery module BM; a second end plate 11 coupled to the channel plate 3 opposite the first end plate 9 to form the space surrounding the battery module BM; and a cover plate 13 coupled to the first end plate 9 and the second end plate 11 opposite the channel plate 3 to form the space surrounding the battery module BM.

In other words, the channel plate 3, first end plate 9, second end plate 11 and cover plate 13 are coupled to each other to provide structural rigidity that surrounds and supports the battery module BM therein, and also, rapidly and stably cool the heat generated from the battery module BM through the refrigerant provided from the outside. For reference, the present exemplary embodiment shows the example where the two battery modules BM are enclosed by the channel plate 3, the first end plate 9, the second end plate 11 and the cover plate 13, however, the present disclosure is not limited thereto. The battery module BM enclosed by the channel plate 3, the first end plate 9, the second end plate 11 and the cover plate 13 may be composed of one or more than three.

In particular, the sizes of the channel plate 3, the first end plate 9, the second end plate 11 and the cover plate 13 may be changed according to the battery module BM. In the present exemplary embodiment, the channel plate 3 may be formed of a hexahedron flat plate shape, one end portion of the channel plate 3 may be formed with a supply port 15 and an outlet 17 for providing and receiving (e.g., exhaust and receive) the refrigerant coupled to the first end plate 9, and the inside of the channel plate 3 may be formed with a plurality of cooling channel 1 that extend from the supply port 15 to the outlet 17, which are formed evenly distributed over the surface contacting with the battery module BM.

Therefore, when the refrigerant circulates along the plurality of cooling channel 1 formed inside the channel plate 3, the battery module BM contacting with the channel plate 3 may be more smoothly and stably cooled and the entire battery cell forming the battery module BM may be also evenly cooled. In addition, the inflow port 5 and the outflow port 7 may be integrally formed at the first end plate 9 to protrude towards the outside, and a flow path 19 connected from the inflow port 5 to the supply port 15 and a flow path 19 connected from the outlet 17 to the outflow port 7 may be formed inside the first end plate 9.

Accordingly, when the first end plate 9 is coupled to the channel plate 3, a rubber ring or the like may be interposed to seal the supply port 15 and the outlet 17 of the channel plate 3. Additionally, a rigid coupling structure may be formed by a plurality of fastening bolts, welding or the like to prevent the joined state from separating. The second end plate 11 may be formed as a double plate structure in which a space 21 is formed therein, and the first end plate 9 and the second end plate 11 may be coupled to the channel plate 3 and the cover plate 13 to provide structural rigidity to wrap and support the internal battery module BM.

In other words, the second end plate 11 is the double plate structure, and the first end plate 9 has a thickness which allows the flow path 19 of refrigerant to be formed therein, the channel plate 3 has a thickness which allows the plurality of cooling channel 1 to be formed therein, and thus, these are firmly coupled to each other to provide sufficient rigidity to wrap and support the internal battery module BM by itself.

Figure 3:
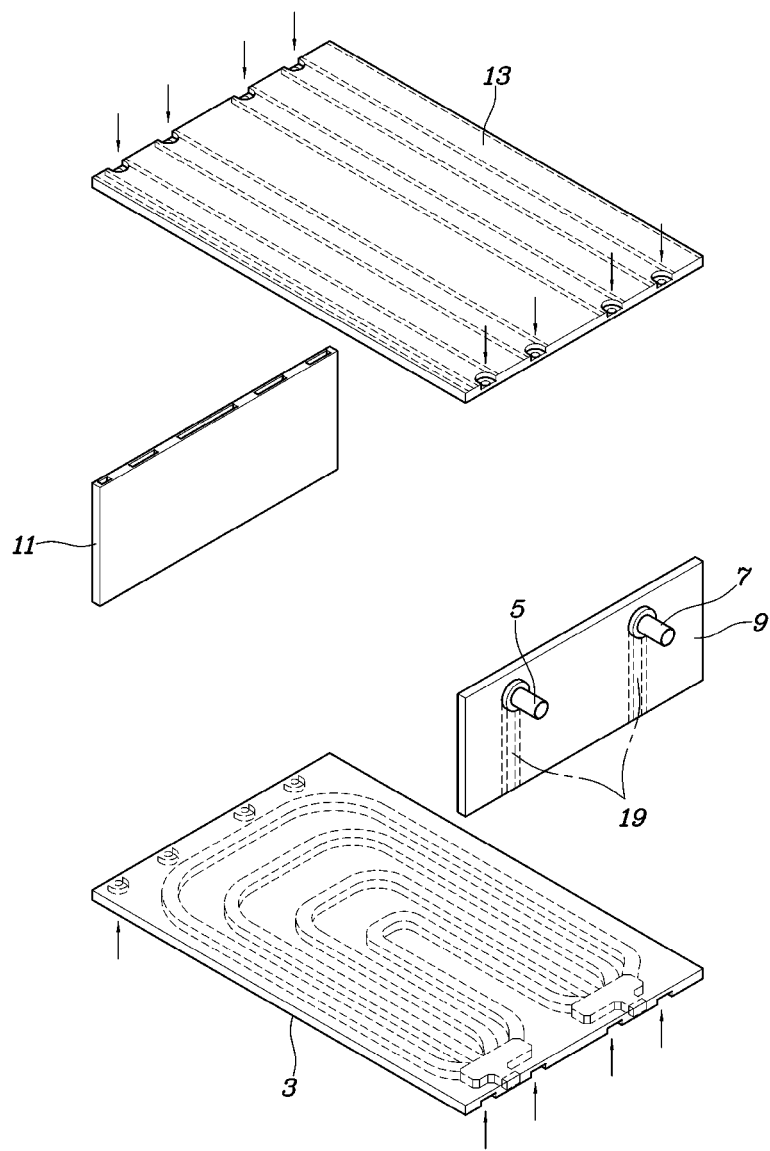
FIG. 3 is a detailed perspective view of the main composition of an exemplary embodiment of the present disclosure.
Figure 4:
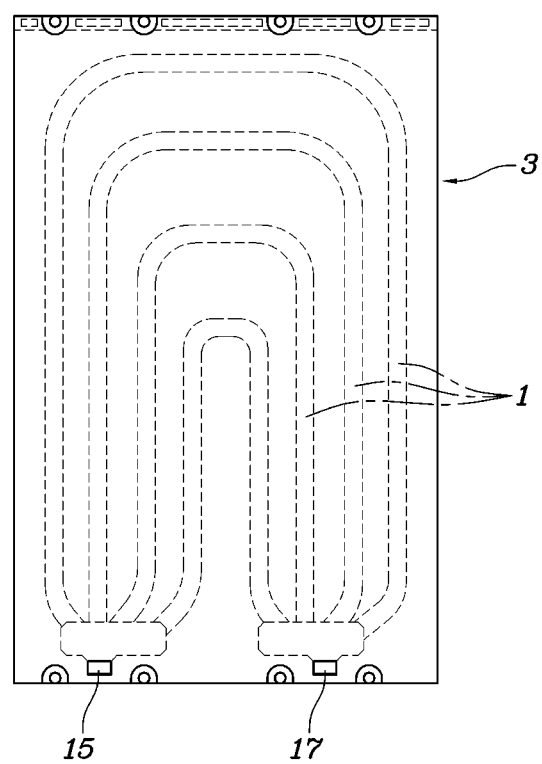
FIG. 4 is a plan view showing the structure of the channel plate according to an exemplary embodiment of the present disclosure.
Figure 5:
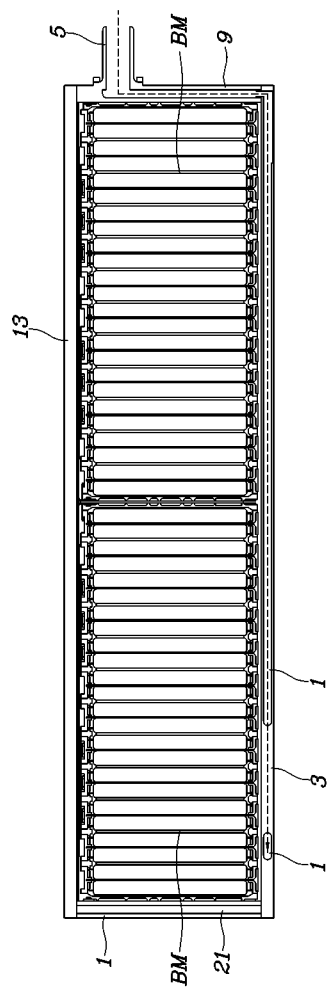
FIG. 5 is a cross-sectional view taken along the V-V line of FIG. 1 according an exemplary embodiment of to the present disclosure.

For reference, arrows shown in FIG. 3 indicate the joint positions of the parts, which mean that the fastening bolts may be fastened or welded at this position to couple to each other. On the other hand, the cover plate 13 may be coupled to the channel plate 3, the first end plate 9 and the second end plate 11 as described above with appropriate thickness or rigidity to secure the sufficient structural rigidity as described above.

Furthermore, the cover plate 13 may have a single plate structure formed by extrusion like the exemplary embodiment of the present disclosure, but the cover plate 13 may have a cooling channel in which the refrigerant circulates in the same manner as the channel plate 3 to further improve cooling performance. In this case, the cooling channel of the cover plate 13 may also be connected to receive and exhaust the refrigerant together via the first end plate 9 as the channel plate 3 is configured to be able to receive and discharge the refrigerant through the first end plate 9.

Figure 6:
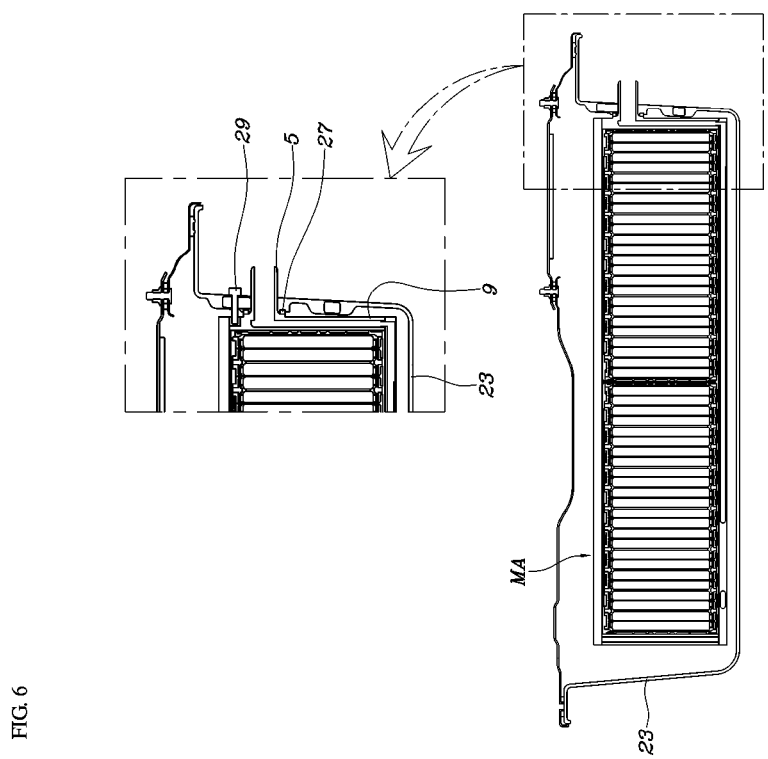
FIG. 6 is a drawing showing a state where a module assembly having the configuration as shown in FIG. 5 is mounted on a case of a vehicle body according an exemplary embodiment of to the present disclosure.

Referring to FIG. 6, at least one battery module BM surrounded by the channel plate 3, the first end plate 9, the second end plate 11 and the cover plate 13 may configure a module assembly MA. In addition, a case 23 provided in the vehicle body for accommodating the module assembly MA may include an aperture 25 through which the inflow port 5 and the outflow port 7 are passed, respectively, a gasket 27 for surrounding and sealing the inflow port 5 and the outflow port 7 may be disposed between the aperture 25 and the first end plate 9, and a tie bolt 29 may be fastened to the first end plate 9 from the outside of the case 23 to apply the pressure necessary for sealing the gasket 27 by pulling the module assembly MA toward the case 23. In other words, the sealing state of the gasket 27 by the compression may be stably and firmly secured due to the tensile force provided by the tie bolt 29.

As described above, the present disclosure provide the channel plate 3, the first end plate 9, second end plate 11 and cover plate 13 that surround and support the internal battery module BM to provide the structural stiffness and thus, the heat generated from the battery module BM may be more smoothly and stably cooled, thereby securing sufficient structural rigidity and cooling performance while using a simplified configurations and fewer components.

Furthermore, the simplified structure of the cooling circuit as described above decreases the possibility of leakage of refrigerant and minimizes unnecessary space to allow the battery cell to be further installed in the space thus secured, thereby increasing the energy density of the battery system.

Although specific exemplary embodiments of the present disclosure have been described and illustrated, those skilled in the art will appreciate that various alternations and modifications are possible without departing from the technical spirit of the present disclosure as disclosed in the appended claims.

What is claimed is:

1. A battery system of a vehicle, comprising:
    a channel plate having one side surface contacted with a battery module and having a cooling channel formed therein in which refrigerant circulates to cool the battery module;
    a first end plate configured to supply the refrigerant transmitted from an outside through an inflow port to the channel plate and transmit the refrigerant passing through the channel plate to the outside through an outflow port, wherein the first end plate is coupled to the channel plate to form a space surrounding the battery module;
    a second end plate coupled to the channel plate opposite the first end plate to form the space surrounding the battery module; and
    a cover plate coupled to the first end plate and the second end plate opposite the channel plate to form the space surrounding the battery module,
    wherein at least one battery module surrounded by the channel plate, the first end plate, the second end plate and the cover plate configures a module assembly, and
    wherein the battery system of the vehicle further includes:
        a case provided in a vehicle body for accommodating the module assembly and including an aperture through which the inflow port and the outflow port are passed, respectively;
        a gasket for surrounding and sealing each of the inflow port and the outflow port and disposed between the aperture and the first end plate; and
        a tie bold fastened to the first end plate from the outside of the case to apply the pressure necessary for sealing the gasket by pulling the module assembly toward the case.

2. The battery system of the vehicle of claim 1, wherein:
    the channel plate is formed of a hexahedron flat plate shape,
    one end portion of the channel plate is formed with a supply port and an outlet coupled to the first end plate to receive and discharge the refrigerant, and
    the inside of the channel plate is formed with a plurality of cooling channel that extend from the supply port to the outlet, which are formed evenly distributed over the surface in contact with the battery module.

3. The battery system of the vehicle of claim 2, wherein:
    the inflow port and outflow port are integrally formed at the first end plate to protrude towards the outside, and
    a flow path connected from the inflow port to the supply port and a flow path connected from the outlet to the outflow port are formed inside the first end plate.

4. The battery system of the vehicle of claim 3, wherein:
    the second end plate is formed as a double plate structure in which a space is formed; and
    the first end plate and the second end plate are coupled to the channel plate and the cover plate to provide structural rigidity to wrap and support the internal battery module.

5. The battery system of the vehicle of claim 1, wherein the cover plate includes a cooling channel in which the refrigerant circulates in a same manner as the channel plate.

6. A vehicle having the battery system of claim 1.

7. A vehicle having the battery system of claim 2.

8. A vehicle having the battery system of claim 3.

9. A vehicle having the battery system of claim 4.

10. A vehicle having the battery system of claim 5.

* * * * *